(12) United States Patent  
Konno et al.

(10) Patent No.: US 7,042,343 B2
(45) Date of Patent: May 9, 2006

(54) ANTI-THEFT DEVICE IN MOTORCYCLE

(75) Inventors: Takeshi Konno, Saitama (JP); Tadashi Onozuka, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/667,155

(22) Filed: Sep. 19, 2003

(65) Prior Publication Data

US 2004/0090306 A1 May 13, 2004

(30) Foreign Application Priority Data

Sep. 26, 2002 (JP) ............................. 2002-281260

(51) Int. Cl.
*B60R 25/10* (2006.01)

(52) U.S. Cl. ............ 340/427; 340/426.13; 340/426.17; 340/426.1; 340/539.1; 340/539.11; 340/542; 180/287

(58) Field of Classification Search ............. 340/539.1, 340/539.11, 542, 427, 426.13, 426.17; 180/287, 180/219; 280/735
See application file for complete search history.

(56) References Cited

U.S. PATENT DOCUMENTS

| 6,237,710 | B1 * | 5/2001 | Mori et al. .................. 180/219 |
| 2003/0024754 | A1 * | 2/2003 | Konno et al. ............... 180/287 |
| 2003/0218536 | A1 * | 11/2003 | Linden et al. .............. 340/427 |

FOREIGN PATENT DOCUMENTS

| FR | 2802889 | * | 6/2001 |
| JP | 2000190885 A | * | 7/2000 |
| JP | 2001182410 | * | 7/2001 |

* cited by examiner

*Primary Examiner*—Julie Bichngoc Lieu
(74) *Attorney, Agent, or Firm*—Carrier, Blackman & Associates, P.C.; Joseph P. Carrier; William D. Blackman

(57) ABSTRACT

An anti-theft device for a motorcycle includes an anti-theft locking mechanism, a remote control, a receiver that receives a locking release signal transmitted from the remote control, a controller that releases locking by the locking mechanism according to the locking release signal, and a locking release mechanism that unlocks the locking mechanism by manual operation of a dedicated key. The locking release mechanism is normally covered with a cover member of the motorcycle such that it is not easily detected by unauthorized persons.

18 Claims, 5 Drawing Sheets

ANTI-THEFT DEVICE IN MOTORCYCLE

CROSS-REFERENCE TO RELATED APPLICATIONS

The present application claims priority under 35 U.S.C. 119, based on Japanese patent application No. 2002-281260, filed Sep. 26, 2002.

BACKGROUND OF THE INVENTION

1. Field of the Invention

The present invention relates to an anti-theft device in a motorcycle. More particularly, the invention relates to an anti-theft device of a type that locks by a locking mechanism for preventing theft, and is normally released by a locking release signal from a remote control, but wherein locking can be manually released in an emergency while still maintaining desirable aspects of theft protection.

2. Description of the Relevant Art

A vehicular anti-theft device in which the locking of a handlebar and a seat is controlled by receiving a control signal transmitted by a remote control from outside of a vehicle and discriminating the control signal is known.

For example, Japanese published unexamined patent application No. 2001-278155 discloses an anti-theft device of a motorcycle which is provided with a G locking device (a shutter-type anti-theft device) that covers a key hole of a key cylinder into which an ignition key for starting an engine is to be inserted and a seat locking device for locking a seat in a closed state. The device controls a control unit according to a G locking release signal or a seat locking release signal transmitted from a remote control, which drives a drive unit by the control unit and which releases G locking and seat locking.

According to such known anti-theft device, as the engine cannot be started and the seat cannot be opened without the remote control, the theft of the vehicle and/or an object housed in a housing box beneath the seat can be prevented.

However, in the anti-theft device disclosed in Japanese published unexamined patent application No. 2001-278155, when the remote control is forgotten or misplaced, and when the drive unit including an actuator does not respond to a locking release signal from the remote control because of any cause, the G locking and the seat locking cannot be released at all.

In emergency even at such time, it is desired that a user be able to suitably manually release the locking devices. However, where anyone can easily release the locking devices from outside the vehicle, theft protection may be deteriorated.

Although the known devices have some utility for their intended purposes, a need still exists in the art for an improved motorcycle anti-theft device. In particular, there is still a need for an improved motorcycle anti-theft device with remote control.

SUMMARY OF THE INVENTION

The present invention provides an apparatus for use as an anti-theft device in a motorcycle which solves the above problem. Particularly, the invention is made in view of such a situation as described above, and an object of the invention is to provide an anti-theft device wherein a locking mechanism for preventing theft may be normally released by a locking release signal transmitted from a remote control, and in which locking can be manually released in an emergency, while otherwise maintaining adequate theft protection in a motorcycle.

According to a first aspect of the present invention there is provided an anti-theft device comprising: an anti-theft locking mechanism, a remote control, a receiver that receives a locking release signal transmitted from the remote control, a controller that releases locking by the locking mechanism according to the locking release signal, and a locking release mechanism that releases locking by the locking mechanism by manual operation of a dedicated key in a motorcycle, the locking release mechanism being covered with a cover member of the motorcycle.

In addition to the first aspect, according to a second aspect of the present invention, the motorcycle cover member includes a dedicated cover which covers the locking release mechanism, and can be selectively opened and closed.

In addition to the first aspect, according to a third aspect of the present invention, the locking release mechanism is provided with a key cylinder which mates with the dedicated key, and the key cylinder is arranged such that the dedicated key can be upwardly inserted from beneath into the key cylinder, when the cylinder is viewed from the side.

According to the first aspect, as the locking release mechanism for releasing locking mechanism by the manual operation of the dedicated key is covered with the cover member, it cannot be normally viewed from the outside. Thus an authorized operator of the vehicle or the like will be aware of the locking mechanism and can manually release same in an emergency, but the locking mechanism normally maintains theft protection by locking and remains undetected by unauthorized persons. Besides, while the locking release mechanism includes the key cylinder, there is little or no fear that a key or the like will be inserted into a keyhole by mistake.

Further, according to the second aspect, as access to the locking release mechanism is enabled by opening the specific cover, locking can be manually released without detaching the whole cover from the motorcycle.

Further, according to the third aspect, as the key cylinder can be hidden from the outside and the manual operation to release the locking mechanism with the dedicated key inserted into the key cylinder is made relatively difficult, the theft protection can be enhanced.

Accordingly, it is another object of the present invention to provide a method and apparatus for an anti-theft device with improved emergency characteristics, in a motorcycle.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF THE INVENTION

Figure 1:
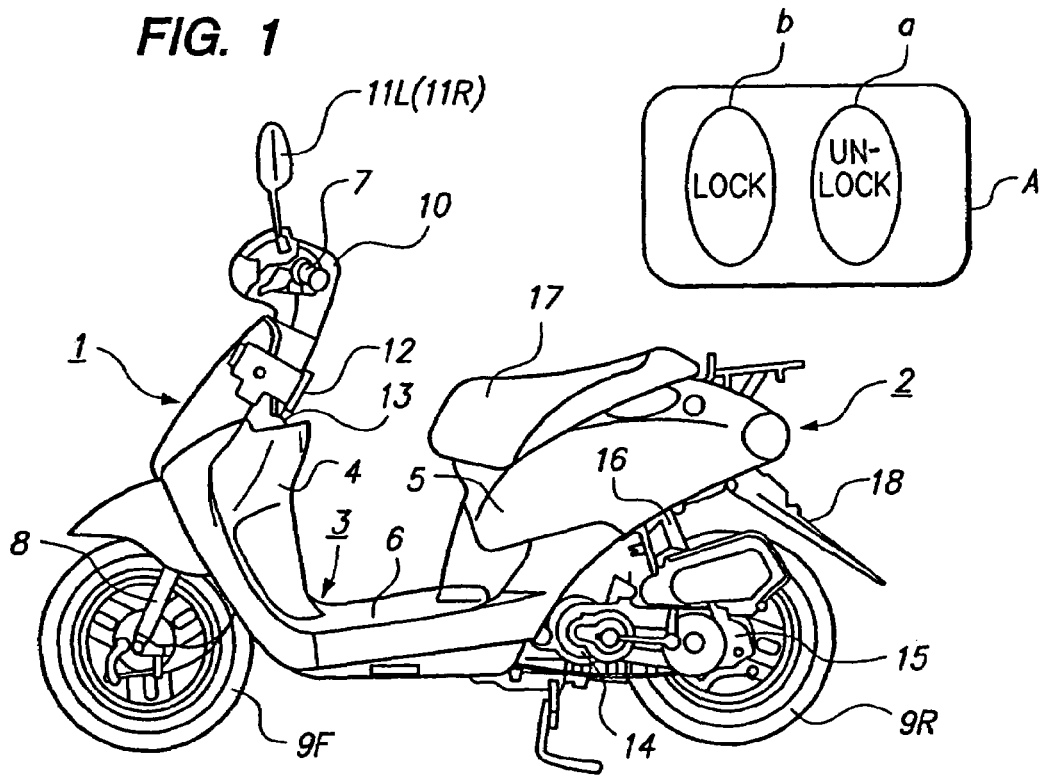
FIG. 1 is a side view showing the appearance of a scooter-type motorcycle to which an anti-theft device according to the invention is applied, and also showing a remote control for a locking mechanism of the motorcycle.

Referring to the drawings, preferred embodiments of the invention will be described in detail below. FIG. 1 is a side view showing the appearance of a scooter-type motorcycle and remote control to which an anti-theft device according to the invention is applied. In this drawing, a cover of a handlebar locking module is omitted. As shown in FIG. 1, the front 1 of the body and the rear 2 of the body are coupled via a low floor 3. A skeleton of the motorcycle is formed by a body frame substantially composed of a down tube and a main pipe (not shown).

The front 1 of the body, the rear 2 of the body and the floor 3 are covered with a front cover or cowl 4, a body cover 5 and a center cover 6. In the front 1 of the body, a handlebar 7 is provided above a steering head with the handlebar supported by the steering head, a front fork 8 is extended downward and a front wheel 9F is supported at its lower end. An upper part of the handlebar 7 is covered with a handlebar cover 10 that also functions as an instrument panel. The steering head, the front fork 8 and the handlebar 7 form the steering mechanism of the motorcycle.

Grips of the handlebar 7 protrude from the handlebar cover 10 in a lateral direction of the body and side mirrors 11L (11R) protrude upward. In relation to the steering mechanism, a handlebar locking module 12 for locking the handlebar 7 is provided. The handlebar locking module 12 locks or unlocks the handlebar 7 in response to a locking signal or a locking release signal transmitted from a remote control A and further includes a locking release mechanism for releasing the locking mechanism if a specific key such as an emergency key is inserted into the release mechanism and is manually turned.

The locking release mechanism is provided with a key cylinder 13 arranged so that the specific key may be inserted substantially upwardly from beneath when the key cylinder is viewed from the side. The configuration of the handlebar locking module 12 will be described in detail below.

A fuel tank and a housing box may be provided and supported by the main pipe inside the body cover 5. Further, an engine such as a single-cylinder four-cycle engine may be mounted on the motorcycle via a swing unit according to conventional knowledge. A belt-type continuously variable transmission 14 may arranged at the back of the engine and a rear wheel 9R may be supported by a speed reducing mechanism 15 provided at the back of a continuously variable transmission via a centrifugal clutch. A rear cushion 16 is inserted between the upper end of the speed reducing mechanism 15 and the main pipe.

A seat 17 is provided above the body cover 5 with the seat covering the housing box. The seat 17 can be lifted and the housing box below the seat can house a helmet and other objects. A number plate fixture 18, loading space and a tail lamp may be provided to the rear of the body cover 5. An intake pipe, a carburetor and an air cleaner are also arranged in connection with the engine, however, they are not shown in FIG. 1.

Figure 2:
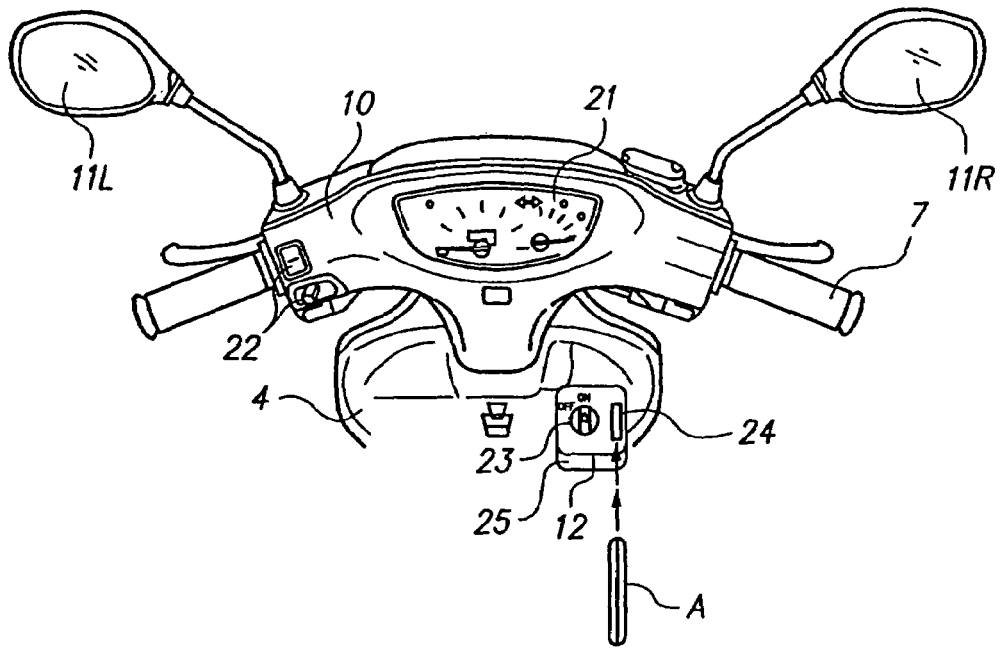
FIG. 2 is a front view showing a configuration of the vicinity of a handlebar cover of the motorcycle shown in FIG. 1.

FIG. 2 is a front view showing the configuration of the vicinity of the handlebar cover 10 shown in FIG. 1 that also functions as the instrument panel. The instrument panel including a speedometer 21 and switches 22 for a light and a turn signal are arranged on the handlebar cover 10, the grips 7 of the handlebar 10 protrude in the lateral direction of the body and the side mirrors 11L, 11R protrude upward.

The front panel of the handlebar locking module 12 is located outside an inner part of the front cover 4, and a main switch 23 and a remote control holder 24 are integrated here. The remote control holder 24 is configured so that a remote control (hereinafter called a remote control key) A is inserted and held. The remote control holder 24 is in a shape of a slit into/from which the remote control key A is inserted/extracted, for example.

The remote control key A is provided with an unlocking button a and a locking button b as shown in FIG. 1, and includes an electronic circuit for transmitting a locking signal or an unlocking signal including specific ID when either button is pressed, and a battery.

A part of the front cover 4 covering the key cylinder 13 functions as an emergency key cover 25, and the emergency key cover 25 is configured so that it can be opened while remaining connected to the front cover 4. Because of this configuration, a user opens the emergency key cover 25 and can manually release the locking of a handlebar when the user inserts the emergency key into the key cylinder 13 and turns it.

Figure 3A:
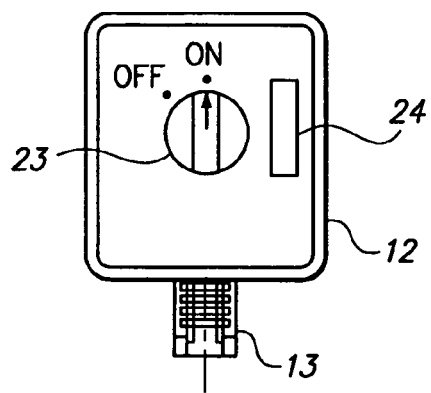
FIGS. 3(a) and 3(b) are a front view and a side view showing one example of a handlebar locking module which may be included with the motorcycle of FIG. 1.
Figure 3B:
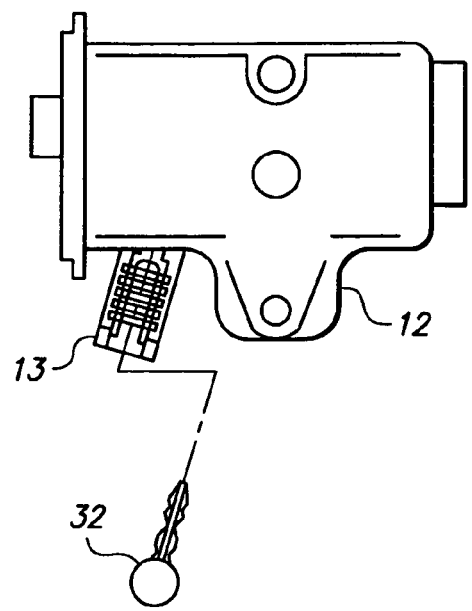

FIGS. 3(a) and 3(b) are a front view and a side view showing one example of the handlebar locking module 12 with the key cylinder 13, which is shown in section. The handlebar locking module 12 is provided with a controller, a handlebar locking actuator, a handlebar locking mechanism and the key cylinder 13. The key cylinder 13 forms a part of the locking release mechanism that releases the locking mechanism by inserting and turning the emergency key 32.

At the front of the handlebar locking module 12, a main switch 23 and the remote control holder 24 are arranged. A remote control setting detection switch for detecting that the remote control key A is inserted into the remote control holder 24 is provided inside the remote control holder 24.

Figure 4A:
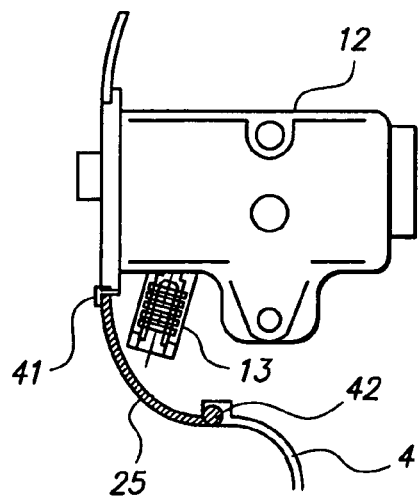
FIGS. 4(a)–4(c) are side views explaining a procedure of operation for releasing a locking mechanism of the module in FIGS. 3(a)–3(b)
Figure 4B:
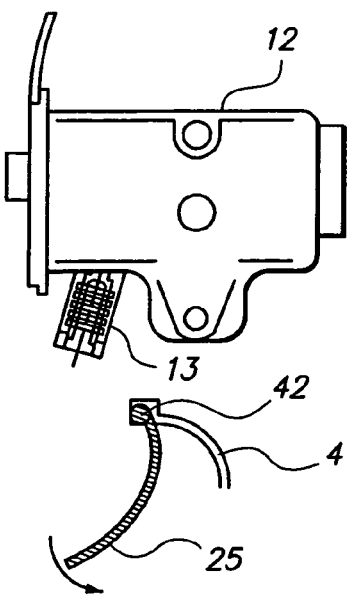
Figure 4C:
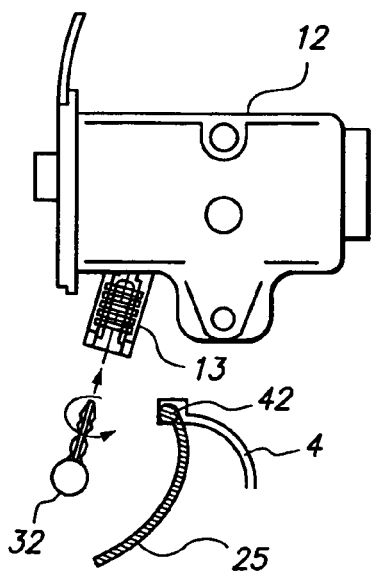

FIGS. 4(a), 4(b) and 4(c) are explanatory drawings of sequential steps in an operational procedure, to be followed in case locking of the handlebar 7 needs to be manually released using the emergency key 32. First, as shown in FIG. 4(a), a clip 41 that latches the emergency key cover 25 in an inner part of the front cover 4 is detached. The emergency key cover may be also configured so that the clip 41 cannot be detached unless a simple password or other security feature is used to prevent an unauthorized person from accessing the locking release mechanism. When the clip 41 is detached, the emergency key cover 25 can be opened, for example, by rotating the cover downwardly about a pivot shaft 42, as shown.

FIG. 4(b) shows a state in which the emergency key cover 25 is open and in this state, a keyhole of the key cylinder 13 is directed substantially downward when the key cylinder is viewed from the side. As shown in FIG. 4(c), if the emergency key 32 is inserted into the keyhole of the key cylinder 13 and is turned, the locking mechanism is released.

Figure 5A:
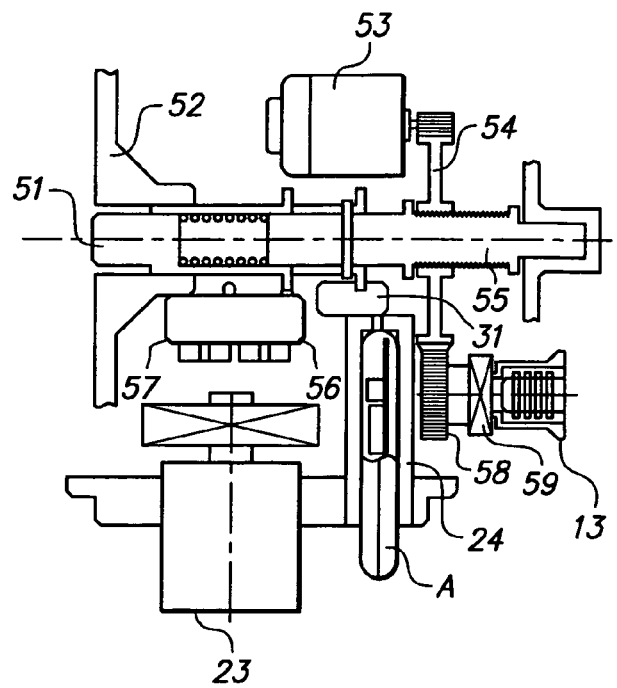
FIGS. 5(a) and 5(b) are schematic diagrams side views showing one example of an internal mechanism of the handlebar locking module.
Figure 5B:
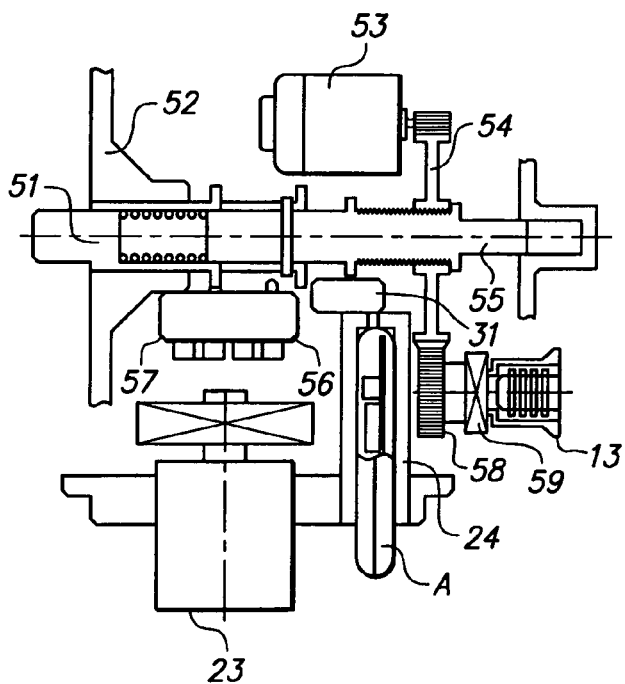

FIGS. 5(a) and 5(b) are schematic diagrams showing one example of the handlebar locking actuator, the handlebar locking mechanism and the locking release mechanism including the key cylinder 13 respectively built in the handlebar locking module 12, FIG. 5(*a*) shows a handlebar locking released state and FIG. 5(*b*) shows a handlebar locked state. When the end of a lock pin 51 is not protruded from an attachment to a frame 52, it shows a handlebar locking released state 5(*a*) and when the end of the lock pin is protruded, it shows a handlebar locked state 5(*b*).

When a motor 53 as the handlebar locking actuator is rotated, the lock pin 51 is driven laterally in the drawings via a ring gear 54 and an inner gear 55 respectively from the speed reducing mechanism. When the lock pin 51 is released, an unlocking detection switch 56 is operated by a protruded piece of the pin, and in a locked state, a locking detection switch 57 is similarly operated. Detection by these detection switches 56, 57 is input to the CPU of the controller to show that the handlebar is locked or unlocked.

The key cylinder 13 is connected to the ring gear 54 via a ring gear 58 and a one-way clutch 59, and in case the emergency key 32 is inserted into the key cylinder 13 and is turned, the ring gear 54 is turned via the one-way clutch 59 and the ring gear 58. Hereby, the lock pin 51 is manually retracted to the handlebar locking released state without depending upon the rotation of the motor 53.

In FIGS. 5(*a*)–(*b*), the main switch 23, operated by a knob, and the remote control holder 24 with the remote control key A inserted therein are also shown, and these components are arranged on the front panel of the handlebar locking module 12 (see also FIG. 2). A remote control setting detection switch 31, provided in the remote control holder 24, is turned on when the remote control key A is inserted into the remote control holder 24.

Figure 6:
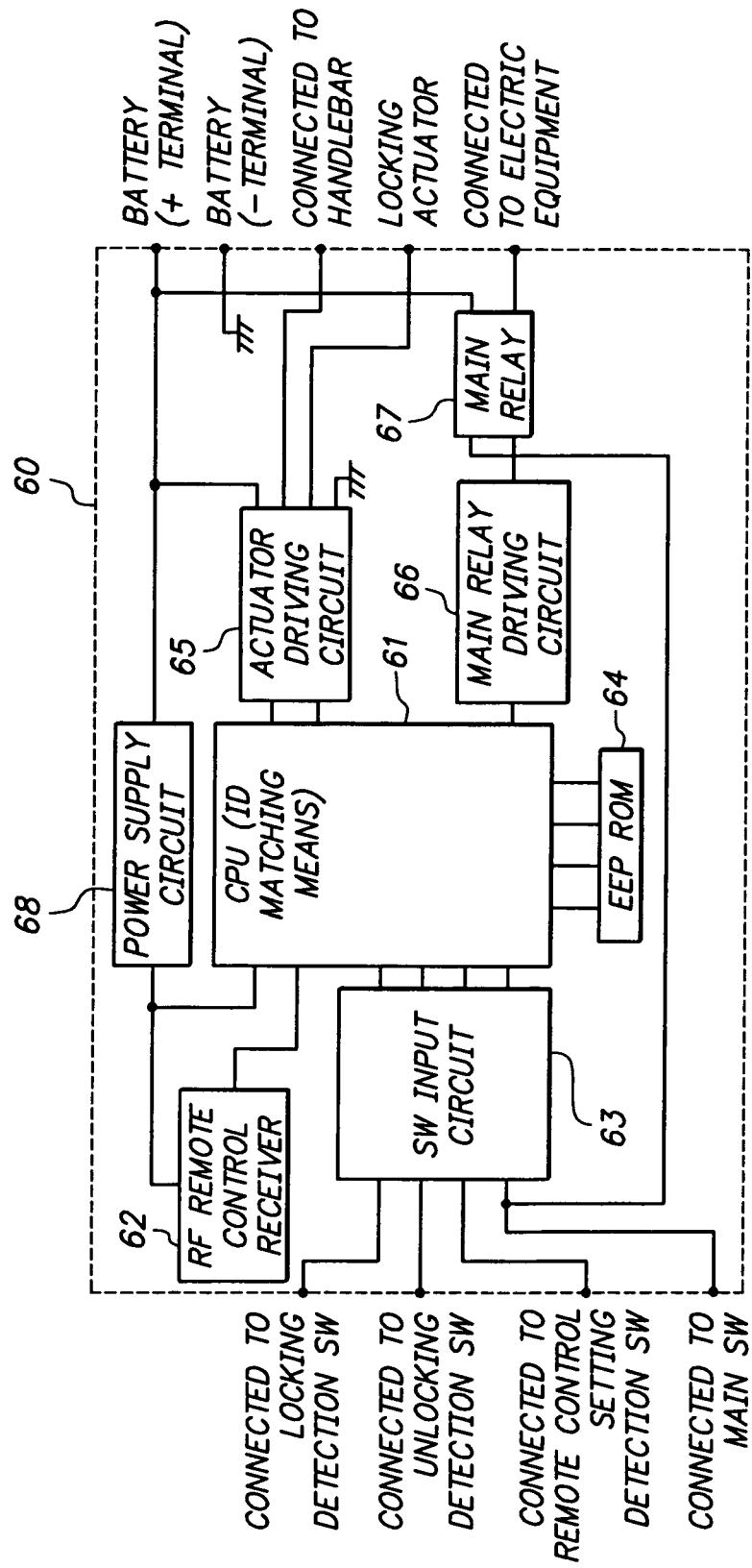
FIG. 6 is a block circuit diagram showing one example of a controller which can receive a signal from the remote control of FIG. 1.

FIG. 6 is a block circuit diagram showing one example of the controller built in the handlebar locking module 12. The controller 60 includes CPU 61 as a control unit, an RF remote control receiver 62 that receives a locking signal or a locking release signal transmitted from the remote control A, the locking detection switch 57, the locking release detection switch 56, a switch input circuit 63 for inputting detection by the remote control setting detection switch 31 and the main switch 23 all operatively connected to CPU 61, storage means 64 such as EEPROM that stores registered ID, an actuator driving circuit 65, a main relay driving circuit 66, a main relay 67 and a power supply circuit 68 that supplies power from a battery to CPU 61 and the RF remote control receiver 62.

The actuator driving circuit 65 drives the handlebar locking actuator and releases the locking of the handlebar in case CPU 61 judges that ID included in a locking release signal transmitted from the remote control key A is coincident with the registered ID. The main relay driving circuit 66 is operated in case CPU 61 judges that ID included in a locking release signal transmitted from the remote control key A is coincident with the registered ID and detection by the remote control setting detection switch 31 is input.

The main relay 67 is driven in case the main relay driving circuit 66 is operated and the main switch 23 is turned on, supplies power to electric equipment including an igniter and enables the starting of the engine.

Next, the operation of the anti-theft device provided with the handlebar locking module 12 will be described. Suppose that the vehicle is stopped, the handlebar 7 is locked by the protrusion of the lock pin 51, the main relay 67 is turned off and no power is supplied to the electric equipment such as the igniter. When in this state, a user presses the unlocking button a of the remote control key A, an unlocking signal including specific ID is transmitted from the remote control key A.

The unlocking signal is received by the RF remote control receiver 62 and is input to CPU 61. CPU 61 matches ID included in the input unlocking signal and the registered ID stored in the storage means 64 beforehand, operates the actuator driving circuit 65 and drives the motor 53 in case CPU judges that both are coincident and makes the protruded lock pin 51 drawn back. Hereby, the locking of the handlebar is released and detection by the unlocking detection switch 56 is input to CPU 61 via the switch input circuit 63.

Next, when the user inserts the remote control key A into the remote control holder 24, the remote control setting detection switch 31 detects it and an insertion detection signal is input to CPU 61 via the switch input circuit 63. Hereby, the main relay driving circuit 66 is operated, when the main switch 23 is turned on in this state, the main relay 67 is driven, power is supplied to the electric equipment including the igniter, and starting of the engine is enabled.

When the engine is stopped, first, the main switch 23 is turned off, the remote control key A is pulled out of the remote control holder 24 and the locking button B is pressed. When a locking signal is transmitted from the remote control key A and is received by the controller 60 of the handlebar locking module 12, the motor 53 is rotated in a reverse direction, the lock pin 51 is protruded, the vehicle's handlebar is locked and locking is completed.

In case the lock pin 51 is not driven by a locking release signal transmitted from the remote control key A because of any cause, the lock pin 51 can be driven if the clip 41 is detached, the emergency key cover 25 is opened, the emergency key 32 is inserted into the key hole of the key cylinder 13 and is turned, as understood from the above description, and locking can be manually released.

Figure 7:
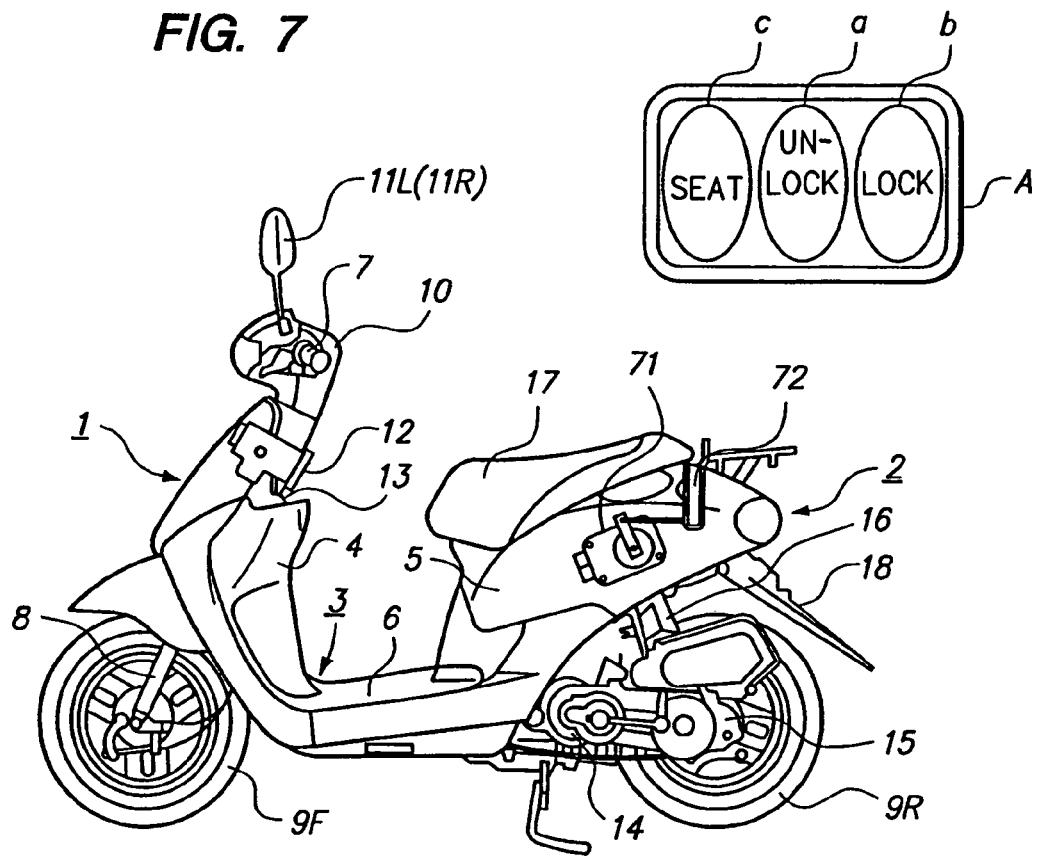
FIG. 7 is a side view showing the appearance of another scooter-type motorcycle and remoter control to which the invention can be applied.

FIG. 7 is a side view showing the appearance of a scooter-type motorcycle in which a seat opening button C is further provided to a remote control key A, the locking of a seat 16 is released by pressing the button and an object can be deposited in/removed from a housing box beneath the seat. The invention can be also applied to a seat locking mechanism of a scooter-type motorcycle. The same reference number is allocated to the same part or the similar part as/to the part shown in FIG. 1.

Operation in case an unlocking button A and a locking button B of the remote control key A are pressed is similar to the operation in the above-mentioned embodiment. When the seat opening button C is pressed, a seat opening signal is transmitted from the remote control key A.

When a seat opening signal is received by a controller in a handlebar locking module 12 and ID included in the received signal is coincident with registered ID, a seat actuator 71 is driven, the locking of a seat by a seat catch 72 is released, the seat 17 can be opened and an object can be deposited in/removed from a housing box below the seat.

In case the seat actuator 71 is not driven by a seat opening signal transmitted from the remote control key A, the locking of the seat can be released similarly to the above-described case of the locking of a handlebar by configuring the seat catch 72 so that the seat actuator can be driven by inserting and turning a dedicated key.

In the invention embodiments described above, variations may be made. For example, the release of locking is described above, however, manual locking may be also similarly made possible. Besides, the invention can be applied to locking for preventing theft of a motorcycle other than in relation to a locking a handlebar and a seat.

Further, the configuration of the handlebar locking module 12 is only one example, the main switch 23 may be also provided to the handlebar cover 10 and the remote control holder 24 may be also provided in the vicinity of the handlebar cover 10 and the instrument panel 21. Further, the engine can be also started only by the operation the remote control key A without installing the remote control holder 24, therefore, without depending upon the remote control switch 31.

As clear from the above description, according to the invention, as the locking release mechanism for releasing a locking mechanism by the manual operation of the dedicated or emergency key is provided, is covered with the cover member and cannot be normally viewed from the outside, locking can be released in emergency, while otherwise maintaining a high level of theft protection by locking. Further, in case the locking release mechanism includes the key cylinder, there is little or no fear that a key and the like are inserted into the keyhole by mistake.

Further, as the locking release mechanism can be accessed by opening the specific cover, the manual release of locking is enabled without detaching the whole cover of the motorcycle. Also, as the key cylinder can be made hardly visible from the outside and manual operation for releasing locking with the specific key inserted into the key cylinder is made relatively difficult, theft protection can be enhanced.

Although the present invention has been described herein with respect to a limited number of presently preferred embodiments, the foregoing description is intended to be illustrative, and not restrictive. Those skilled in the art will realize that many modifications of the preferred embodiment could be made which would be operable. All such modifications, which are within the scope of the claims, are intended to be within the scope and spirit of the present invention.

Having thus, described the invention, what is claimed is:

1. An anti-theft device in a vehicle, said device comprising:
   an anti-theft locking mechanism operable to temporarily lock a position of a handlebar of said vehicle by inhibiting pivotal movement thereof;
   a remote control apparatus which is usable to remotely operate the anti-theft locking mechanism;
   a receiver that is adapted to receive a locking release signal transmitted from the remote control apparatus;
   a controller that is operable to release locking by the locking mechanism according to the locking release signal; and
   a manual override locking release mechanism that is operable to bypass the controller and to mechanically unlock the locking mechanism by manual operation of a dedicated key in a vehicle;
   the locking release mechanism being normally covered with a cover member of the vehicle.

2. An anti-theft device in a vehicle according to claim 1, wherein the cover member includes
   a cover which covers the locking release mechanism, and which is capable of being selectively opened and closed.

3. An anti-theft device in a vehicle according to claim 1, wherein the locking release mechanism is provided with a key cylinder into which the dedicated key can be inserted; and
   the key cylinder is arranged in a position in which the dedicated key is insertable therein substantially upwardly from beneath when the key cylinder is viewed from the side.

4. An anti-theft device in a vehicle according to claim 1, wherein The cover member comprises a portion of a front cowl of the vehicle.

5. An anti-theft device in a vehicle according to claim 2, wherein the cover member further includes a latch for selectively maintaining the cover in a closed position.

6. An anti-theft device in a vehicle according to claim 2, wherein the cover remains connected to the cover member when the cover is in an open position.

7. An anti-theft device in a vehicle according to claim 2, wherein the locking release mechanism is provided with a key cylinder into which the dedicated key is insertable; and
   the key cylinder is arranged in a position in which the dedicated key is inserted therein substantially upwardly from beneath when the key cylinder is viewed from the side.

8. A motorcycle, comprising:
   a frame and a handlebar pivotally attached to the frame;
   an anti-theft locking mechanism operable to temporarily lock a position of the handlebar by inhibiting pivotal movement thereof;
   a remote control apparatus which is usable to remotely operate the anti-theft locking mechanism;
   a receiver that is adapted to receive a locking release signal transmitted from the remote control apparatus;
   a controller that is operable to release locking by the locking mechanism according to the locking release signal; and
   an electronically actuated locking release mechanism; and
   a manual override locking release mechanism independent of an ignition system of the motorcycle, the locking release mechanism including a dedicated key that is capable of unlocking the locking mechanism by manual operation of the dedicated key;
   the manual override locking release mechanism being normally covered with a cover member of the motorcycle.

9. A motorcycle according to claim 8, wherein the cover member includes a cover which covers the locking release mechanism, and is selectively manually opened and closed.

10. A motorcycle according to claim 8, wherein the locking release mechanism is provided with a key cylinder into which the dedicated key is insertable; and
    the key cylinder is arranged in a position in which the dedicated key is inserted therein substantially upwardly from beneath when the key cylinder is viewed from the side.

11. A motorcycle according to claim 8, wherein the cover member comprises a portion of a front cowl of the motorcycle.

12. A motorcycle according to claim 9, wherein the cover member further includes a latch for normally maintaining the cover in a closed position.

13. A motorcycle according to claim 9, wherein the cover remains connected to the cover member when the cover is in an open position.

14. A motorcycle according to claim 9, wherein the cover is pivotally connected to the cover member.

15. A motorcycle according to claim 8, including two anti-theft devices comprising said anti-theft locking mechanism and a second anti-theft device, which are respectively associated with the steering handlebar and a seat of the motorcycle, wherein the remote control provides means for selectively controlling the seat independently of the anti-theft locking mechanism.

16. A motorcycle according to claim 9, wherein the locking release mechanism is provided with a key cylinder into which the dedicated key is insertable; and the key cylinder is arranged in a position in which the dedicated key is inserted therein substantially upwardly from beneath when the key cylinder is viewed from the side.

17. In a two wheeled motor vehicle comprising a cover member, an ignition system, and a steering system, the ignition system comprising a first key dedicated to the ignition, and an ignition switch, the improvement comprising an anti-theft device, the anti-theft device comprising:

an anti-theft locking mechanism operably connected to the steering system;

a remote control apparatus;

a receiver that is adapted to receive a locking release signal transmitted from the remote control apparatus;

a controller that is operable to release locking by the locking mechanism according to the locking release signal; and a manual override locking release mechanism that is operable to unlock the anti theft locking mechanism by manual operation of a second key that is dedicated to the manual override locking release mechanism;

the manual override locking release mechanism capable of being selectively covered with the cover member of the vehicle.

18. An anti-theft device comprising:

an anti-theft locking mechanism for locking a handlebar;

a remote control apparatus which is usable to remotely operate the anti-theft locking mechanism;

a receiver that is adapted to receive a locking release signal transmitted from the remote control apparatus;

a controller that is operable to release locking by the anti-theft locking mechanism according to the locking release signal;

an emergency locking release mechanism for permitting a user to manually override the anti-theft locking mechanism; and a dedicated key for use with the locking release mechanism;

the locking release mechanism comprising a key cylinder configured to receive the dedicated key therein, and a mechanical connection between the key cylinder and the anti-theft locking mechanism, wherein when the dedicated key is manually operated within the key cylinder, the key cylinder mechanically drives the anti-theft locking mechanism to an unlocked state.

* * * * *